(12) United States Patent
Kochavi et al.

(10) Patent No.: US 11,782,865 B1
(45) Date of Patent: Oct. 10, 2023

(54) FLEXIBLE DATA HANDLING

(71) Applicant: Amazon Technologies, Inc., Seattle, WA (US)

(72) Inventors: Gal Kochavi, Binyamina (IL); Benny Pollak, Yad Binyamin (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/303,561

(22) Filed: Jun. 2, 2021

(51) Int. Cl.
| | |
|---|---|
| *G06F 13/36* | (2006.01) |
| *G06F 13/42* | (2006.01) |
| *G06F 13/16* | (2006.01) |
| *G06F 13/20* | (2006.01) |

(52) U.S. Cl.
CPC ...... *G06F 13/4221* (2013.01); *G06F 13/1673* (2013.01); *G06F 13/1678* (2013.01); *G06F 13/20* (2013.01); *G06F 13/161* (2013.01)

(58) Field of Classification Search
CPC ............. G06F 13/4221; G06F 13/1673; G06F 13/1678; G06F 13/20; G06F 13/161
See application file for complete search history.

(56) References Cited

U.S. PATENT DOCUMENTS

| | | | | |
|---|---|---|---|---|
| 2007/0186018 A1* | 8/2007 | Radulescu | .............. | H04L 45/00 710/100 |
| 2007/0226407 A1* | 9/2007 | Radulescu | .......... | G06F 13/4208 711/110 |
| 2009/0106465 A1* | 4/2009 | Drerup | .................. | G06F 13/364 710/113 |
| 2012/0311371 A1* | 12/2012 | Shaeffer | ................ | G06F 13/287 713/501 |
| 2019/0294959 A1* | 9/2019 | Vantrease | .............. | G06N 3/063 |
| 2019/0347125 A1* | 11/2019 | Sankaran | ............ | G06F 9/30036 |

\* cited by examiner

*Primary Examiner* — Henry Tsai
*Assistant Examiner* — Kim T Huynh
(74) *Attorney, Agent, or Firm* — Weaver Austin Villeneuve & Sampson LLP (57) ABSTRACT

An integrated circuit can be used to regulate data flow in a computing system. The integrated circuit can receive input data via a first interface associated with a first type of bus protocol and provide output data via a second interface associated with a second type of bus protocol. Size of the input data and the output data may vary based on the corresponding protocols. The integrated circuit can receive, via the first interface, an input data size for a write transaction to store the input data in a data storage unit. The integrated circuit can also receive a requested data size, via the second interface, to provide the output data for a read transaction. The integrated circuit can also generate an actual size of the output data based on the requested data size, the input data size, and size of the stored input data.

18 Claims, 6 Drawing Sheets

FLEXIBLE DATA HANDLING

BACKGROUND

A computing system may utilize different bus protocols for communication among various on-chip or off-chip components. Certain components (e.g., a CPU or a memory) may have higher bandwidth or performance requirements as compared to other components (e.g., peripherals). In most implementations, different types of bus interfaces with varying bus sizes may be utilized to support the performance or bandwidth requirements. Thus, as the data flows in the system through different bus protocols, it may be desirable to maintain the system requirements without compromising the performance or the bandwidth.

BRIEF DESCRIPTION OF THE DRAWINGS

Various embodiments in accordance with the present disclosure will be described with reference to the drawings, in which.

DETAILED DESCRIPTION

A computing system may comprise multiple chips or dies to meet performance or bandwidth demands for complex applications including high-performance computing (HPC), artificial intelligence (AI), networking, cloud computing, or web hosting. For example, a system-on-chip (SoC) may be an example of a computing system that may include multiple dies connected using die-to-die (d2d) interfaces, e.g., Serializer/De-Serializer (SerDes) interfaces. As an example, a die may include one or more processors, graphical processor units (GPUs), microcontrollers, or memory, and another die may include one or more peripherals, input/output (I/O) controllers, network controllers, or direct memory access (DMA) controllers. Different components of each die can communicate using various on-chip interfaces based on the system requirements. For example, Advanced Microcontroller Bus Architecture (AMBA) Advanced Peripheral Bus (APB), AMBA Advanced High-performance Bus (AHB), AMBA Advanced eXtensible Interface (AXI) bus, or another on-chip bus can be used for communication among the different components.

Generally, the data flows in the system between components from one bus protocol to another. For example, an AXI interconnect fabric can connect a processor to an on-chip memory via the APB, and to an off-chip memory via an external bus interface, e.g., a peripheral component interconnect express (PCIe) interface, a universal serial bus (USB) interface, or a serial advanced technology attachment (SATA) interface. In another example, the AXI interconnect fabric can connect the processor to a peripheral via the APB on a first die, and to a d2d physical (PHY) layer to communicate with a second die via a d2d PHY interface. Thus, size of the data transferred between the components may vary based on the protocol. As an example, the AXI interface protocol may utilize different bus sizes for the read data, write data, read address, write address, or the write response channels that can vary for each write or read transaction. The data size for the d2d PHY interface may vary based on the number of transmit (TX) and receive (RX) channels used by the SerDes PHY. Thus, based on the application, the data size may become narrower or wider as the data flows from the AXI interface to the d2d PHY interface, or from the d2d PHY interface to the AXI interface.

In certain implementations, change in the data size from one bus protocol to another may introduce bubble cycles (or bubbles) in the data flow, which may impact the system bandwidth. A bubble may represent an idle or a NOP (no operation) cycle in a data transfer pipeline without any data. For example, the bubbles may be caused when a transmitter of data is slower than a receiver of the data, or the receiver of the data is expecting more data than transmitted by the transmitter. In some instances, it may take more than one clock cycle to assemble the required size of the data expected by the receiver, which can cause bubbles in the data flow and increase the latency for data transfer. For example, if size of the data (e.g., 16 bytes) transmitted by the transmitter is smaller than the size of the data (e.g., 48 bytes) expected by the receiver, one or more bubble cycles may be introduced until the expected size of the data (e.g., 48 bytes) has been received and/or assembled. These additional bubble cycles may delay the data transfer and reduce the overall system performance. Thus, it is desirable to avoid bubbles in the data flow to maintain the system bandwidth or performance requirements.

Certain embodiments can provide systems and methods to regulate the data flow in a computing system to meet the system performance requirements without introducing any bubbles. A data flow regulator circuit based on a flexible data structure can be used to regulate the data flow in the system. The data flow regulator circuit may include an input interface coupled to a first interconnect based on a first type of bus protocol, a data storage unit, and an output interface coupled to a second interconnect based on a second type of bus protocol. The input interface may be configured to receive input data and an input data size for a write transaction based on the first type of bus protocol. The output interface may be configured to receive a requested data size to provide output data for a read transaction based on the second type of bus protocol. The input data size may vary based on the first type of bus protocol for each write transaction, and the requested data size may vary based on the second type of bus protocol for each read transaction.

The input data for the write transaction can be stored in the data storage unit to be provided for the read transaction. Certain embodiments can allow providing the output data as soon as a write enable for the write transaction is received, or as soon as a read enable for the read transaction is received. The output data can be obtained from the input data or the stored input data based on the input data size, size of the stored input data, and the requested data size. If the read enable for the read transaction is received in the same cycle as the write enable, the output data can be obtained from the input data if the data storage unit is empty. If the data storage unit is not empty, the output data can be obtained from the stored input data if the requested data size is smaller than or equal to the size of the stored input data.

In such cases, if the read enable is received in the same cycle as the write enable, the input data for the write transaction can be stored in the data storage unit to be used for the read transaction(s) received in the later cycles.

If the requested data size is greater than the size of the stored input data but smaller than a sum of the input data size and the size of the stored input data, a portion of the output data can be obtained from the stored input data and a remaining portion of the output data can be obtained from the input data if the read enable is received in the same cycle as the write enable. The remaining portion of the input data can be stored in the data storage unit to be read for later transactions.

Certain embodiments can determine an actual size of the output data provided for the read transaction based on the size of the input data, size of the stored input data, and the requested data size. For example, in certain instances, the requested data size may be greater than the sum of the input data size and the size of the stored input data. In such cases, the output data can be provided using the available input data and the stored input data without waiting for the remaining data to arrive. In some instances, when the read enable is received in a later cycle than the write enable, and the requested data size is greater than the size of the stored input data, the output data may be obtained from the stored input data and the actual data size may indicate the size of the stored input data. The actual data size can be sent to the receiver of the output data indicating size of the output data provided. Thus, the output data can be provided without any delay or introducing bubble cycles even if enough data has not been received or stored based on the requested size. The data flow can be maintained in this manner without compromising the bandwidth or the performance of the system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
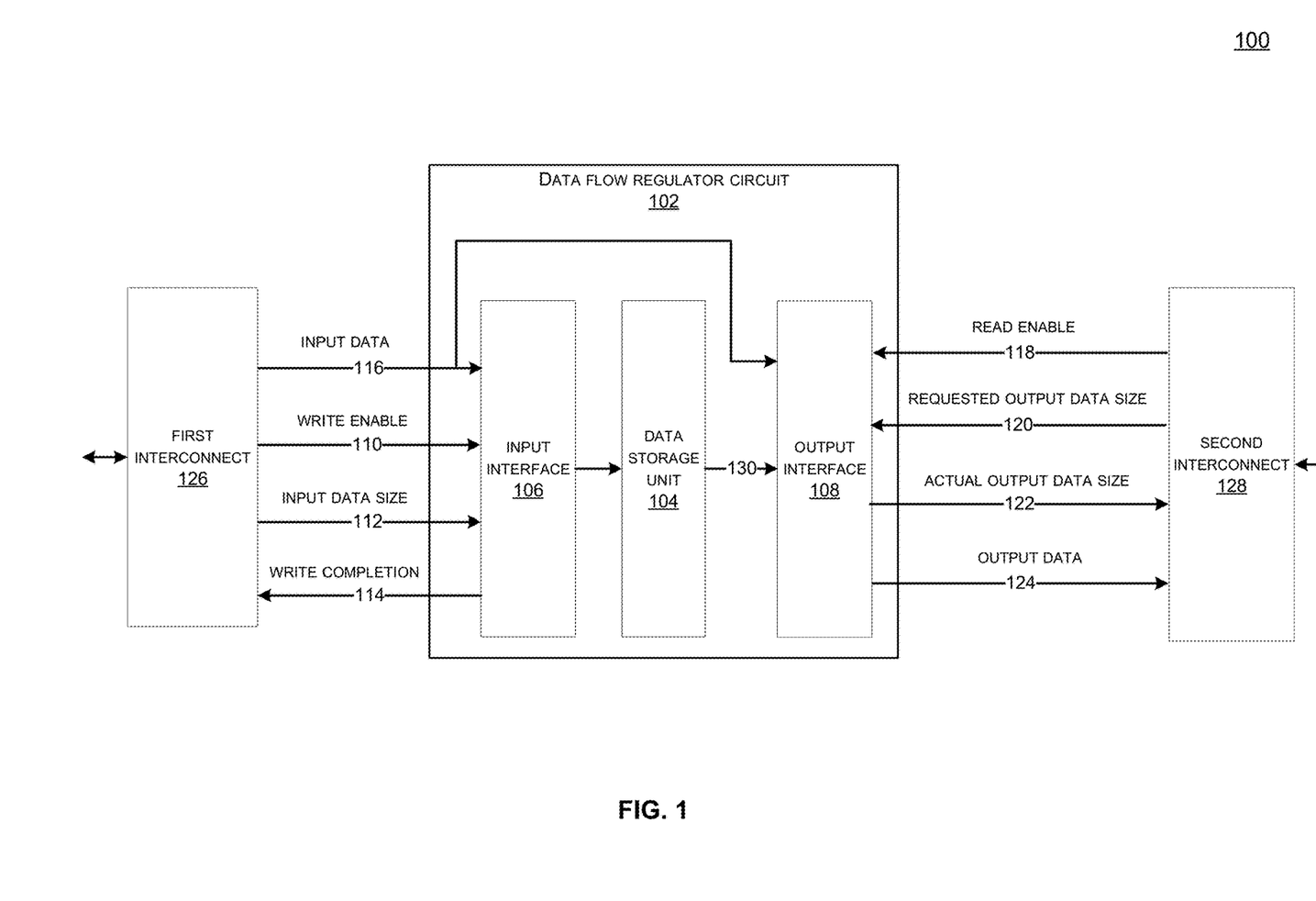
FIG. 1 illustrates an apparatus comprising a data flow regulator circuit to regulate data flow in a computer system according to certain embodiments.

FIG. 1 illustrates an apparatus 100 comprising a data flow regulator circuit 102 to regulate data flow in a computer system according to certain embodiments. The data flow regulator circuit 102 may comprise a data storage unit 104, an input interface 106 and an output interface 108. The apparatus 100 can be part of a system-on-chip (SoC), a field programmable gate array (FPGA), an application specific integrated circuit (ASIC), or another suitable computing system.

The data flow regulator circuit 102 may be configured to communicate with various interconnects that may be based on different protocols using corresponding interfaces. For example, the input interface 106 may be configured to communicate with a first interconnect 126 that may be based on a first type of bus protocol, and the output interface 108 may be configured to communicate with a second interconnect 128 that may be based on a second type of bus protocol. The first type of bus protocol or the second type of bus protocol may include an on-chip bus protocol (e.g., AXI, AMBA, AHB, APB, Avalon) or an off-chip bus protocol (e.g., d2d, PCIe, SATA, USB). The first interconnect 126 or the second interconnect 128 may include one or more of a bus, a bridge, a switch, a crossbar, a multiplexer, a de-multiplexer, or other suitable interfaces. The first interconnect 126 or the second interconnect 128 may connect the data flow regulator circuit 102 to a component of the computing system (e.g., a processor, memory, a DMA controller, a peripheral), an internal bus, a bridge coupled to a component via another bus, an external bus interface that is coupled to an external device (e.g., an external memory device), or a d2d interface that is coupled to a d2d PHY. The data storage unit 104 may include a data buffer, which can be implemented using any suitable type of data structure such as a queue or a circular FIFO.

The input interface 106 may be configured to receive a write enable 110, an input data size 112 and input data 116 through the first interconnect 126 for a write transaction. The input data size 112 may indicate a size of the input data 116 which can vary for the type of transaction based on the protocol associated with the first interconnect 126. The input data 116 may include payload (e.g., actual data) for the transaction or information (e.g., address, controls, or status) associated with the transaction. The input data size 112 may not exceed the maximum width of the input data bus supported by the protocol associated with the first interconnect 126.

The output interface 108 may be configured to receive a read enable 118 and a requested output data size 120 through the second interconnect 128 to provide output data 124 for a read transaction. Generally, if the requested output data size 120 is smaller than or greater than the size of the input data 116, the input data 116 may need to be partitioned or assembled, respectively, to provide the output data 124. In certain systems, change in the data size between the bus interfaces may introduce bubble cycles which can impact the bandwidth. For example, if the transmitter of the input data 116 is slower than the receiver of the output data 124, one or more bubble cycles may be introduced before the requested output data size 120 of the output data 124 becomes available. As an example, the input data 116 may be 16 bytes in size, and the receiver of the output data 124 may be expecting 48 bytes of the output data 124. In such cases, one or more bubble cycles may be introduced until the 48 bytes of the output data 124 have been received and/or assembled. These additional bubble cycles may delay the data transfer and reduce the overall system performance.

In certain embodiments, the data flow regulator circuit 102 may include a bypass mode which can allow providing the output data 124 as soon as the input data 116 becomes available to meet the performance demand. For example, when the write enable 110 is asserted (e.g., set to 1) for a write transaction, the input data 116 can also be made available to the output interface 108. If the read enable 118 is asserted (e.g., set to 1) in the same cycle as the write enable 110 is asserted, the output data 124 can be obtained from the input data 116 if there is no stored data in the data storage unit 104 (e.g., the data buffer is empty), or the requested output data size 120 is greater than the size of the data stored in the data buffer. However, if the read enable 118 is asserted in later cycles, the input data 116 can be stored in the data storage unit 104 based on the input data size 112 to provide stored input data 130 for future read transactions. The output data 124 can be obtained from the stored input data 130 as soon as the read enable 118 is asserted for a read transaction.

Certain embodiments can allow performing multiple write transactions sequentially to store the input data 116 in the data storage unit 104 without performing a read transaction as long as the data storage unit 104 has the capacity to store the input data 116. The input data size 112 can be different for each write transaction. For example, for a given write transaction, if the input data size 112 combined with the size of the stored input data 130 is less than the size of the data storage unit 104, the input data 116 can be stored in the data storage unit 104. The size of the data storage unit 104 may depend upon the maximum bus width of the input data 116 or the maximum value allowed for the input data size 112 based on the associated protocol. In certain embodiments, the input interface 106 may also be configured to generate a write completion 114 once a write transaction has completed. The write transaction can be considered completed when the input data 116 has been stored in the data storage unit 104 or has been used to provide the output data 124 for a read transaction.

Certain embodiments can allow providing the available output data 124 based on the input data 116, the stored input data 130, or both as soon as the read enable 118 is asserted even if the size of the input data 116 or the stored input data 130, or their sum is smaller than the requested output data size 120. If the size of the output data 124 doesn't meet the requested output data size 120, an actual output data size 122 of the output data 124 can be determined based on the requested output data size 120, the input data size 112 and the size of the stored input data 130. The actual output data size 122 can be sent in response to the read transaction to indicate the size of the output data 124 provided. As an example, in one instance, only 20 bytes may have been written in the data storage unit 104; however, the requested output data size 120 may indicate that 40 bytes are expected by the receiver. In such cases, the 20 bytes stored in the data storage unit 104 may be provided to the output data 124 without introducing any bubbles on the output interface 108, and the actual output data size 122 may indicate the size of the output data 124 to be 20 bytes.

Certain embodiments can allow reading partial data stored in the data storage unit 104. As an example, 40 bytes may have been written into the data storage unit 104; however, the requested output data size 120 may indicate that 20 bytes are expected by the receiver. In such cases, only 20 bytes (e.g., lower 20 bytes) can be provided to the output data 124 and the actual output data size 122 may be the same as the requested output data size 116. The remaining 20 bytes stored in the data storage unit 104 can be read in the later read transactions. Generally, the data for the read transactions is read from the data storage unit 104 in the same order as it is written into the data storage unit 104 for the write transactions. This is described with reference to FIG. 2.

Figure 2:
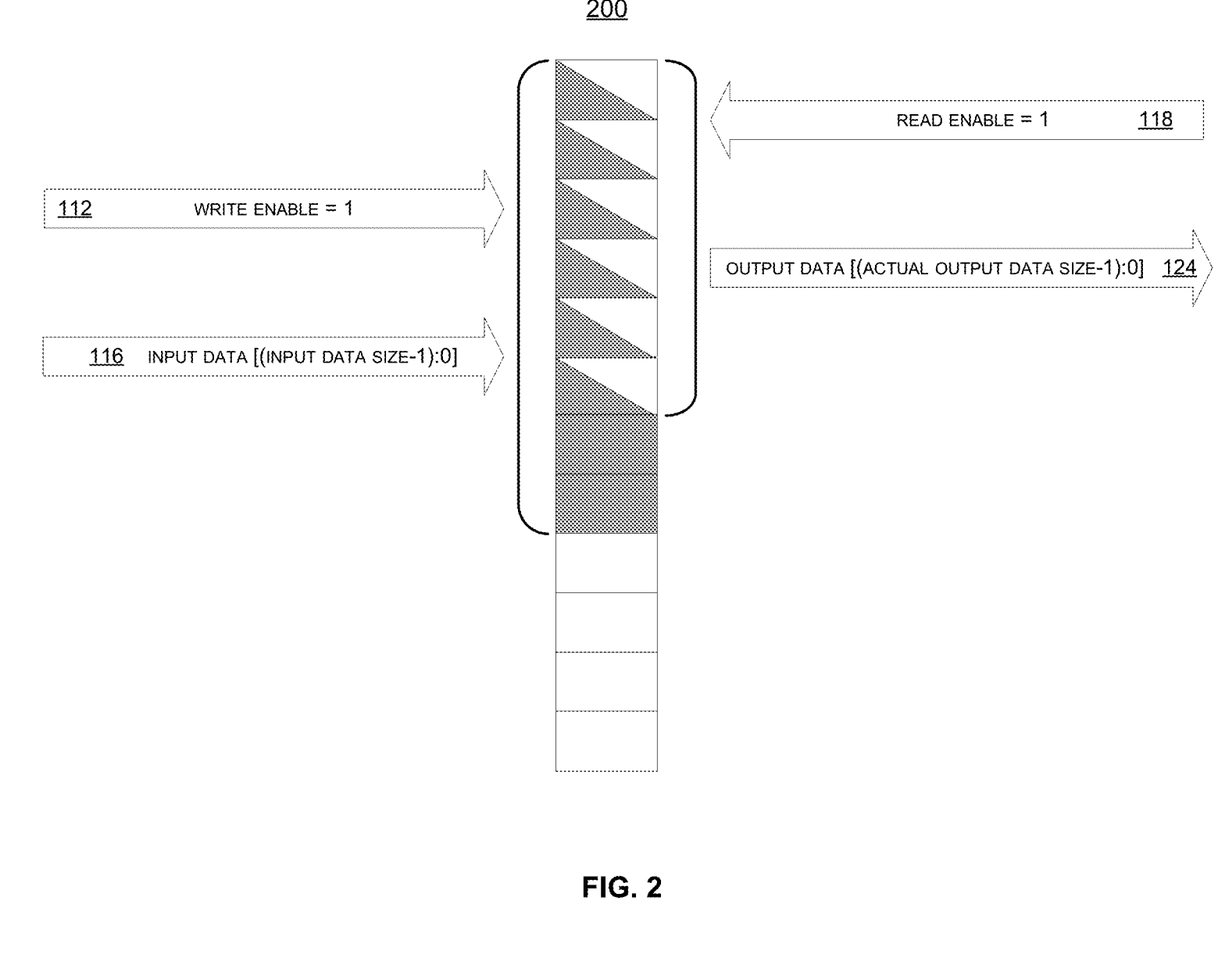
FIG. 2 illustrates a data buffer that can be used to describe certain embodiments.

FIG. 2 illustrates a data buffer 200 that can be used to describe certain embodiments. The data buffer 200 can be an example of the data storage unit 104 in FIG. 1.

In certain examples, the data buffer 200 can be written with the input data 116 of the size [(input data size-1):0], when the write enable 110 is asserted (e.g., set to 1) for a write transaction. Thus, the size of the input data 116 written into the data buffer 200 is based on the input data size 112 and the space available in the data buffer 200. Similarly, in certain examples, the data buffer 200 can be read when the read enable 118 is asserted (e.g., set to 1) for a read transaction. The output data 124 obtained from the data buffer 200 or from the input data 116 can be of the size [(actual output data size-1):0]. As shown in FIG. 2, when the requested output data size 120 is smaller than the size of the data stored in the data buffer 200, partial data corresponding to the requested output data size 120 may be obtained from the data buffer 200 to provide the output data 124. In such cases, the actual output data size 122 and the requested output data size 116 may be the same. The remaining data in the data buffer 200 can be read in the later transaction.

Thus, utilizing the input data size 112, the requested output data size 120, and the actual output data size 122 can allow various embodiments to regulate the data flow in the computing system 100 efficiently and in a timely manner without introducing any bubbles. For example, when the size of the available data for the read transaction is smaller than the requested output data size 120, instead of introducing bubble cycles, the available data along with the actual output data size 122 can be provided to the receiver of the data as soon as the read enable 118 is asserted to minimize the data transfer latency. The operation of the data flow regulator circuit 102 is further explained with reference to FIG. 3.

Figure 3:
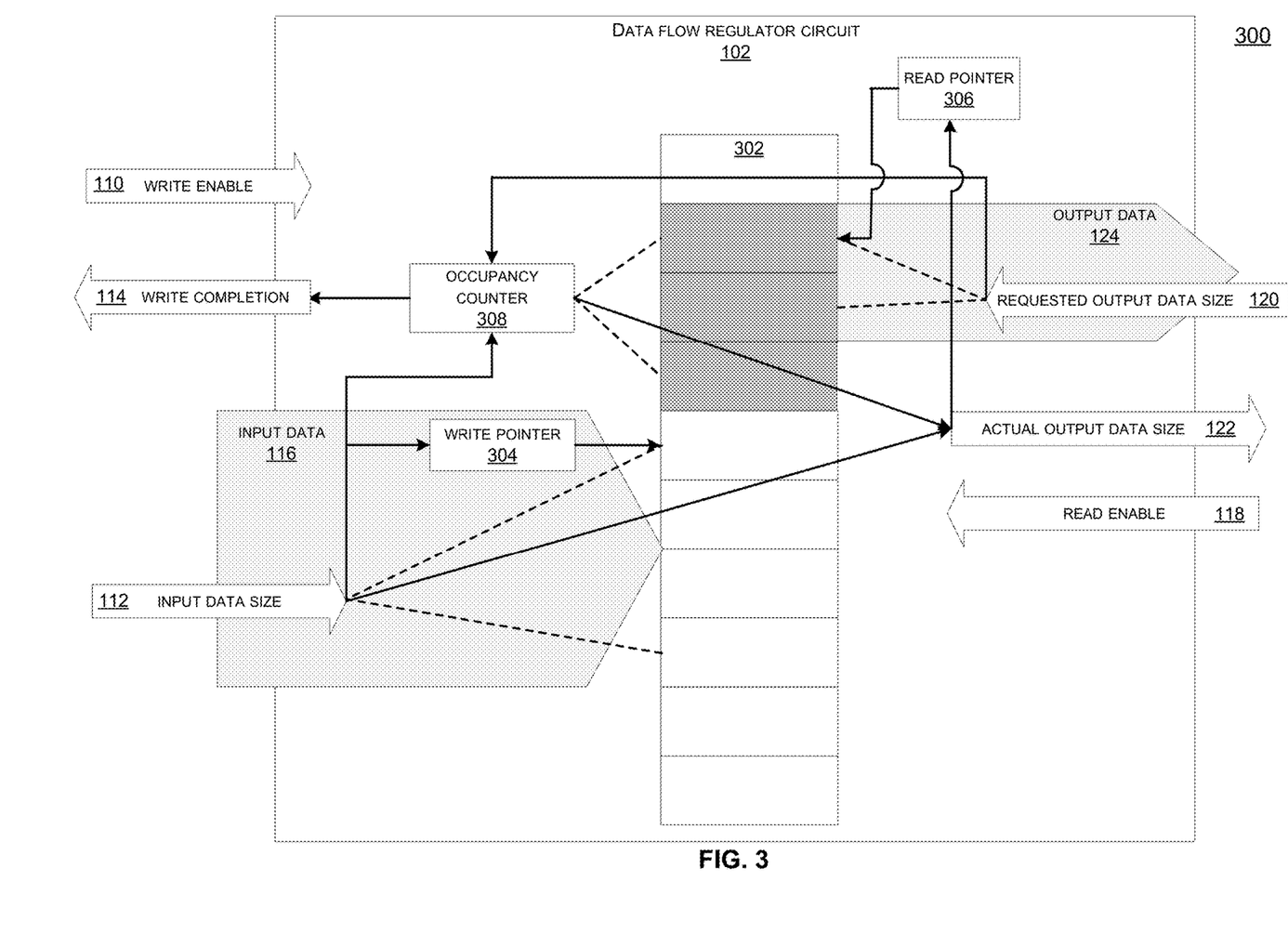
FIG. 3 shows an apparatus which can be used to describe an example implementation of the data flow regulator circuit based on a flexible data structure, in certain embodiments.

FIG. 3 shows an apparatus 300 which can be used to describe an example implementation of the data flow regulator circuit 102 based on a flexible data structure, in certain embodiments.

A data buffer 302 may be an example of the data storage unit 104 in the data flow regulator circuit 102. The data buffer 302 may include N entries, wherein each entry of the N entries is of size M bytes. As an example, N can have a value equal to or greater than the maximum size (or width) of the data bus carrying the input data 116 (or the maximum size of the input data 116 that can be written into the data storage unit 104 as indicated by the input data size 112). The data buffer 302 can be implemented using flip-flops, latches, registers, or other suitable memory type based on a suitable data structure such as a circular buffer, or a FIFO.

The input interface 106 of the data flow regulator circuit 102 may be configured to receive the write enable 110, the input data 116, and the input data size 112 for each write transaction. For example, the write enable 110 may be asserted (e.g., set to 1), and the input data size 112 may indicate the size of the input data 116 for each write transaction. An example implementation of the data buffer 302 may include a write pointer 304 and a read pointer 306 to control writing and reading of the data buffer 302. The output interface 108 of the data flow regulator circuit 102 may be configured to receive the read enable 118 to provide the output data 124 for a read transaction, and the requested output data size 120 for the output data 124.

The write pointer 304 may point to a next entry of the data buffer 302 where the input data 116 can be written. The write pointer 304 can point to a first entry of the data buffer 302 after reset, or after the last entry of the data buffer 302 has been written. For each write of the data buffer 302, the write pointer 304 can advance to a number of entries based on the value of the input data size 112. As an example, the data buffer 302 may include 128 entries (e.g., N=128) and each entry can be 1 byte in size (e.g., M=1). Thus, the maximum size of the input data 116 as indicated by the input data size 112 can be 128. Note that only 10 entries of the data buffer 302 are shown in FIG. 3 for ease of illustration.

The read enable 118 can be asserted (e.g., set to 1) for each read transaction to read the data from the data buffer 302. In certain implementations, an empty signal can be used to indicate when the data buffer 302 is empty. In some instances, the read enable 118 can be asserted for a read transaction upon determining that the data buffer 302 is not empty. The read pointer 306 may point to where the last entry was read from. The read pointer 306 may be updated based on the actual output data size 122.

In certain embodiments, an occupancy counter 308 may be used to indicate a number of occupied entries in the data buffer 302. The occupancy counter 308 may be 0 at reset when the data buffer 302 is empty, and can be incremented based on the input data size 112 for each write of the data buffer 302. The occupancy counter 308 may also be used to generate the write completion 114 once the input data 116 has been written into the data buffer 302 or has been bypassed to the output data 124. In certain instances, the data buffer 302 may not have enough space to store the input data 116 (e.g., if the input data size 112 combined with the occupancy counter 308 is more than the size of the data buffer 302) and the read transaction has not been received, and therefore the write transaction may not be completed. In such cases, the write completion 114 is not generated and the occupancy counter 308 is not incremented.

The occupancy counter 308 may also be used to generate the actual output data size 122. For example, the actual output data size 122 can be determined based on the number of occupied entries in the data buffer 302 as indicated by the occupancy counter 308 for the stored input data, the requested output data size 120, and the input data size 112 for the current input data 116. The occupancy counter 308 may be decremented for each read transaction based on the size of the output data 124 to be read from the data buffer 302 as indicated by the requested output data size 120. One or more write transactions can be completed without any read transaction if the size of the data buffer 302 is more than the combined value of the occupancy counter 308 and the input data size 112 for a given write transaction. The read transactions can be performed in the same order as the write transactions were completed. However, the embodiments can allow reading partial data from the data buffer 302 based on the requested output data size 120.

As shown in FIG. 3, in one example, the occupancy counter 308 may have a value of 3 indicating that 3 entries are stored in the data buffer 302. The read enable 118 may be asserted for a read transaction to read 2 entries of the data buffer 302 based on the value of the requested output data size 120 being equal to 2. The output data 124 may correspond to the first 2 entries stored in the data buffer 302 since the requested output data size 120 is smaller than the size of the stored input data 130 as indicated by the occupancy counter 308. The occupancy counter 308 may be decremented by 2 after the read transaction is completed and the data buffer 302 may only have one occupied entry (e.g., the occupancy counter 308 becomes 1). The actual output data size 122 may be equal to the requested output data size 120 for this read transaction. The read pointer 306 may now point to the third occupied entry that has not been read. The occupied entry can be read using another read transaction with a requested output data size 120 of 1, or can be read after one or more additional write transactions are completed. The one or more additional write transactions can be for different sizes of the input data 116.

As shown in FIG. 3, the write pointer 304 may point to an entry subsequent to the last occupied entry, where the next 4 bytes of the input data 116 can be written as indicated by the input data size 112 (e.g., the input data size 112 is 4). In certain embodiments, a bypass mode can be used to provide the output data 124 as soon as the write enable 110 is asserted for a write transaction. Thus, the read enable 118 can be asserted for a read transaction as soon as the write enable 110 is asserted (or when the data buffer 302 is not empty) and the output data 124 can be obtained from the input data 116 or the stored input data 130 in the same cycle. In the bypass mode, when the input data 116 is provided as the output data 124 in the same cycle, the input data 116 may not be stored in the data buffer 302.

In one example, the requested output data size 120 may be 5 for a read transaction. In such cases, the output data 124 may include the 1 byte of the stored data 130, and the 4 bytes of the input data 116 in the current cycle. The 5 bytes of the output data 124 can be provided in the same cycle as soon as the write enable 110 is asserted. The occupancy counter 308 may become 0 after the read transaction to read the 5 bytes is completed, and the write completion 114 may be asserted indicating completion of the write transaction. In another example, the requested output data size 120 may be 1 for a read transaction. In such cases, the 1 byte of the stored data 130 can be provided as the output data 124 and the occupancy counter 308 may become 0. If the read enable 118 to read the single byte is asserted in the same cycle as the write enable 110 to write the 4 bytes, then the input data 116 can be stored in the data buffer 102 to be read in later cycles. The occupancy counter 308 may become 4 after the write transaction is completed, and the write completion 114 may be asserted indicating completion of the write transaction. In another example, the requested output data size 120 may be less than 5 and greater than 1 (e.g., 3). In such cases, the output data 124 may include the 1 byte of the stored data 130, and 2 lower bytes of the input data 116, and can be provided in the current cycle. Additionally, the remaining 2 bytes of the input data 116 can be stored in the data buffer 302 to be read in the later cycles. The occupancy counter 308 may become 2 after the write transaction is completed, and the write completion 114 may be asserted indicating completion of the write transaction.

In another example, the requested output data size 120 may be more than 5. Since only 5 bytes are available, the output data 124 comprising the 1 byte of the stored data 130 and the 4 bytes of the input data 116 can be provided in the current cycle for the read transaction. The actual output data size 122 may be determined using the occupancy counter 308 and the input data size 112 and can be provided with the output data 124. For example, the actual output data size 122 may indicate that the size of the output data 124 is 5. Note that in this case the input data 116 may not be stored in the data buffer 302. Furthermore, the occupancy counter 308 may become 0 after the last occupied entry of the data buffer 302 has been read, and the write completion 114 may be asserted indicating completion of the write transaction. Thus, instead of waiting for the expected number of bytes to arrive, the output data 124 can be provided in the same cycle as the read enable 118 is asserted to meet the performance requirements without introducing any bubble cycles.

Thus, certain embodiments can provide flexibility with reading different sizes of the data as soon as the data is available without any delay. The input data 116 can be written into the data buffer 302 if there is space available in the data buffer 302 based on the input data size 112 and the occupancy counter 308. The write pointer 304 and the read pointer 306 can wrap around after their respective maximum values have been reached.

Figure 4:
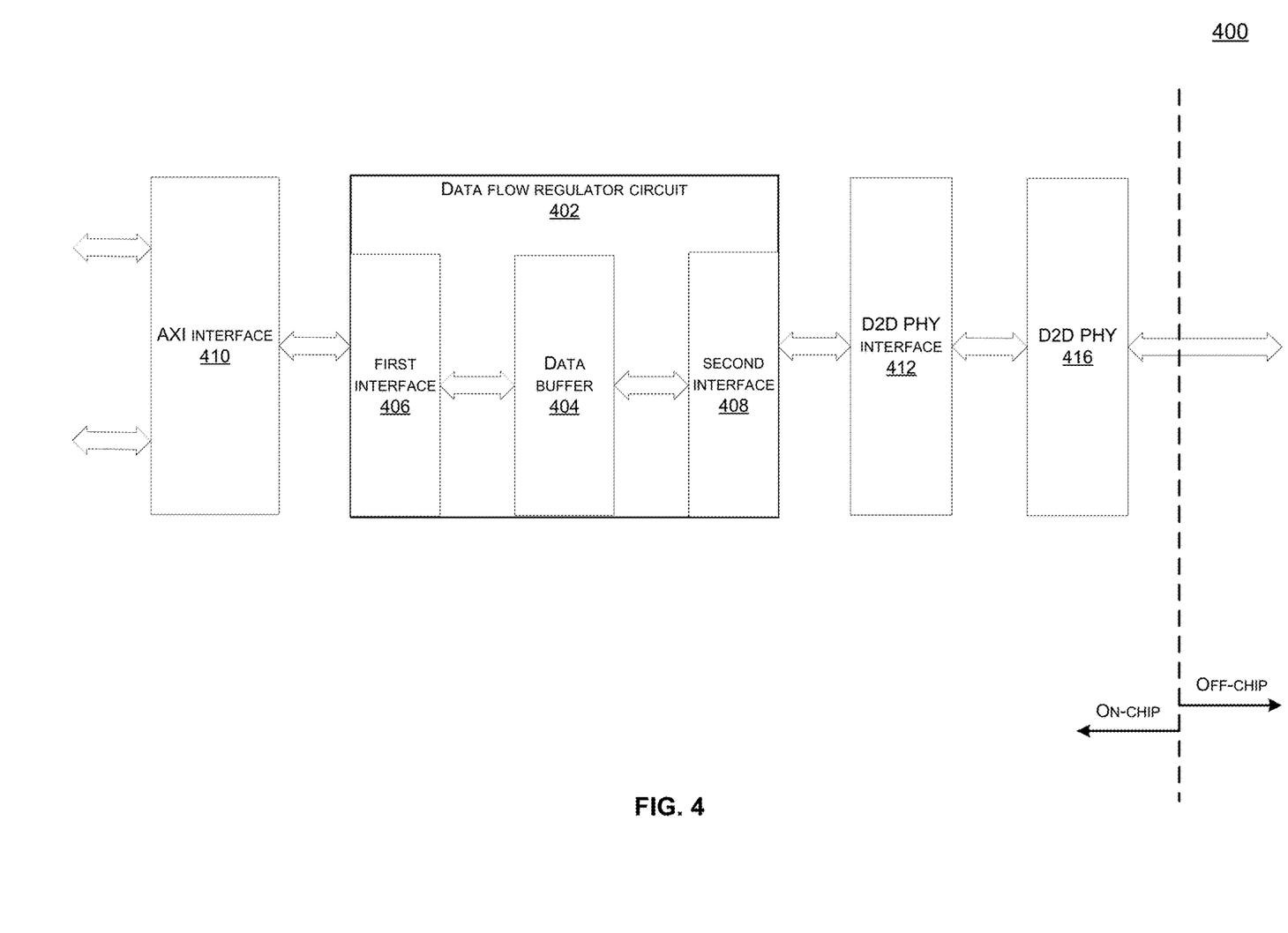
FIG. 4 shows an apparatus for a computing system where certain embodiments can be used.

FIG. 4 shows an apparatus 400 for a computing system where certain embodiments can be used. In certain examples, the apparatus 400 can be part of an SoC configured for a certain application such as AI, high performance computing, networking, cloud computing, or web services, among others.

The apparatus 400 may include a data flow regulator circuit 402 comprising a data buffer 404, a first interface 406 and a second interface 408. The data flow regulator circuit 402 may be an example of the data flow regulator circuit 102. The first interface 406 may be configured to communicate with one or more on-chip components (e.g., CPU, memory, DMA controller, GPU, peripherals) of the SoC based on the AXI protocol via an AXI interface 410. The AXI interface 410 may be an example of the first interconnect 126 in FIG. 1. In certain examples, the AXI interface 410 may include an AXI interconnect that may be coupled to an AXI bridge to communicate with certain components via a different bus. For example, the AXI bridge may connect to one to more peripherals on the APB bus. The AXI interconnect may also be coupled to an external memory via an external bus interface (e.g., SATA, PCIe, or USB). The first interface 406 may support different transaction channels associated with the AXI protocol. For example, the first interface 406 may function as a secondary interface and communicate with a primary interface via the AXI interface 410 using the AXI transactions for address, data, and a response.

In certain examples, the input data size 112 and the input data 116 may correspond to an AXI transaction associated with one or more of an address channel, a read data channel, a write data channel, or a write response channel. Thus, size of the input data 116 corresponding to the one or more channels may vary for each write transaction as indicated by the input data size 112. As an example, the corresponding input data size 112 for each channel can vary between 1-byte and 128-bytes based on the type of channel, and therefore the input data size 112 for each write transaction may vary based on the number of channels and the type of channels for the given write transaction. The first interface 406 may receive the write enable 110, the input data size 112 and the input data 116 for each write transaction via the AXI interface 410. The first interface 406 may also generate the write completion 114 based on the occupancy counter 308. The data buffer 404 may store the input data 116 based on the input data size 112 using the write pointer 304. In certain examples, the write enable 110 can be used as the VALID signal and the write completion 114 can be used as the READY signal to perform a handshake between the primary interface and the secondary interface.

The second interface 408 may be configured to receive the read enable 118 and the requested output data size 120 for a read transaction from a d2d PHY 416 via a d2d PHY interface 414. The d2d PHY interface 412 may be an example of the second interconnect 128. The d2d PHY interface 414 can provide an interface to the d2d PHY 416 based on any suitable d2d interface protocol, e.g., SerDes, Bunch-of-Wires (BoW), open high bandwidth interconnect (HBI), high bandwidth memory (HBM), or advanced interface bus (AIB), used by the d2d PHY 416 for off-chip communications. In certain examples, the d2d PHY 416 can be used to perform the functionality of a framing layer for a SerDes interface. For example, the requested output data size 120 for a read transaction from the SerDes PHY may be 42 bytes, which is different than the input data size 112 for the AXI transactions. Thus, certain embodiments can be used to maintain the data flow between the AXI interface 410 and the d2d PHY 416 without compromising the performance or the bandwidth.

Certain embodiments can be used to perform the write transactions based on an off-chip interface protocol and the read transactions based on an on-chip interface protocol. In certain embodiments, the d2d PHY interface 414 may be an example of the first interconnect 126 and the AXI interface 410 may be an example of the second interconnect 128. For example, the input data size 112, the input data 116, and the write completion 114 may correspond to a write transaction based on a SerDes interface protocol, and the read enable 118, the requested output data size 120, the actual output data size 122, and the output data 124 may correspond to a read transaction based on the AXI protocol. Thus, the data flow regulator circuit 402 can be used in different embodiments to meet the system requirements as the data size changes between different bus protocols.

Figure 5:
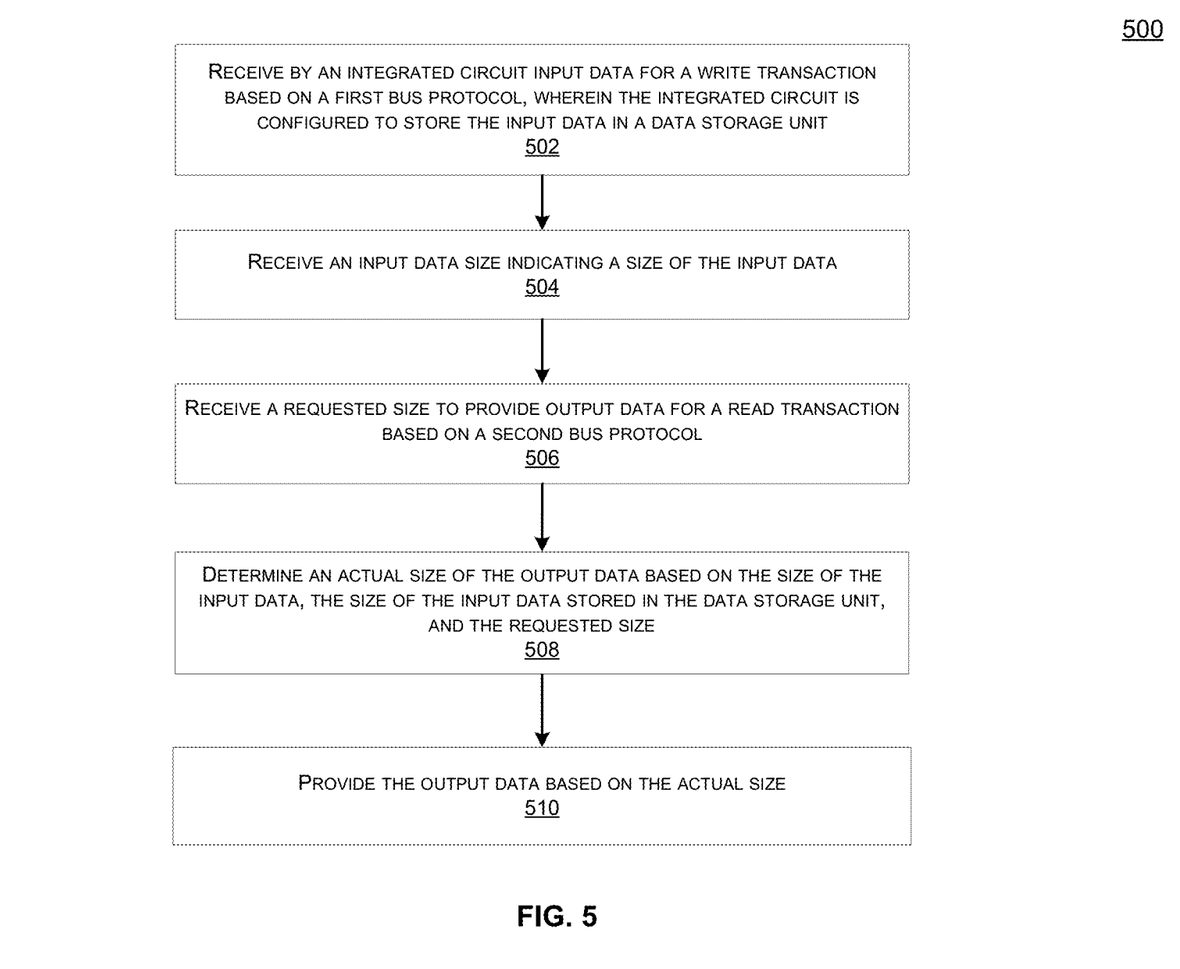
FIG. 5 illustrates a flow chart for a method to regulate data flow in a computing system, according to certain embodiments.

FIG. 5 illustrates a flow chart 500 for a method to regulate data flow in a computing system, according to certain embodiments. The method can be executed by the data flow regulator circuit 102.

In step 502, the method may include receiving input data for a write transaction based on the first bus protocol. As discussed with reference to FIG. 3, the data flow regulator circuit 102 may receive the input data 116 for a write transaction using the input interface 106. The input interface 106 may communicate with the first interconnect 126 based on the first bus protocol (e.g., the AXI interface 410). The write transaction may correspond to an AXI transaction associated with one or more of an address channel, a read data channel, a write data channel, or a write response channel. The input data 116 may include the payload or the information associated with any of the AXI channels. The input interface 106 may also receive the write enable 110 to perform the write transaction. The data flow regulator circuit 102 may be configured to store the input data 116 in the data storage unit 104.

In step 504, the method may include receiving an input data size indicating a size of the input data. The data flow regulator circuit 102 may receive the input data size 112 using the input interface 106. The input data size 112 may indicate the size of the input data 116 for the write transaction. The input data size 112 may correspond to an AXI transaction associated with one or more of an address channel, a read data channel, a write data channel, or a write response channel. Thus, size of the input data 116 may vary based on the number of valid channels and the type of channels for each write transaction, as indicated by the input data size 112.

In step 506, the method may include receiving a requested size to provide output data for a read transaction based on a second bus protocol. The data flow regulator circuit 102 may receive the requested output data size 120 and the read enable 118 using the output interface 108 to provide the output data 124 for a read transaction. The output interface 108 may communicate with the second interconnect 128 based on the second bus protocol (e.g., the d2d PHY interface 412). For example, the requested output data size 120 and the read enable 118 may be received from the d2d PHY interface 414.

The data flow regulator circuit 102 may determine whether the input data 116 can be stored in the data buffer 402 based on the available space in the data buffer 402 and if the read enable 118 for the read transaction is received in the same cycle as the write enable 110 for the write transaction. The data flow regulator circuit 102 may store the input data 116 in the data buffer 402 if the input data size 112 combined with the occupancy counter 308 is smaller than the size of the data buffer 402, and if no read transaction is received in the same cycle as the write transaction (e.g., the write enable 110 and the read enable 118 are not asserted in the same cycle), or if a read transaction is received in the same cycle and the requested output data size 120 is smaller than the occupancy counter 308. If the read transaction is received in the same cycle as the write transaction, the input data 116 may not be stored in the data buffer 402 if the data buffer 402 is empty (e.g., the occupancy counter 308 is 0) and the requested output data size 120 is greater than or equal to the input data size 112.

In step 508, the method may include determining an actual size of the output data based on the size of the input data, the size of the input data stored in the data storage unit, and the requested size. The data flow regulator circuit 102 may determine the actual output data size 122 based on the input data size 112, the occupancy counter 308, and the requested output data size 120. For example, if the occupancy counter 308 is 0, and the requested output data size 120 is greater than or equal to the input data size 112, the actual output data size 122 may be same as the input data size 112. If the occupancy counter 308 is not zero (e.g., there is data stored in the data storage unit 104), and the requested output data size 120 is greater than the sum of the input data size 112 and the occupancy counter 308, the actual output data size 122 may be equal to the sum of the input data size 112 and the occupancy counter 308. If the requested output data size 120 is equal to the occupancy counter 308, the actual output data size 122 may be same as the requested output data size 120, and the output data 124 may be obtained from the stored input data 130. If the requested output data size 120 is smaller than the occupancy counter 308, the actual output data size 122 may be same as the requested output data size 120, and the output data 124 may be obtained from a portion of the stored input data 130. In such cases, the input data 116 may be stored in the data storage unit 104 to be read in later cycles along with the remaining stored input data 130.

In step 510, the method may include providing the output data based on the actual size. The data flow regulator circuit 102 may provide the output data 124 based on the actual output data size 122. For example, the output data 124 may be obtained from the input data 116, the stored input data 130, or both. The data flow regulator circuit 102 may also output the actual output data size 122 to the d2d PHY interface 412 indicating the actual size of the output data 124 transmitted.

Thus, as discussed with reference to FIGS. 1-5, certain embodiments can utilize a flexible data structure to control the flow of data in a computing system using the data flow regulator circuit 102. The data flow regulator circuit 102 can communicate with separate interconnects that may be based on different protocols without introducing any delays in the data transfer from one bus interface to another. The bypass mode can allow transferring the input data in addition to the stored input data from one interconnect to another in the same cycle if the requested output data size is greater than the size of the stored input data. Use of the input data size, requested data size and the actual data size can provide flexibility in supporting various sizes for the data transfer between different types of bus interfaces as soon as the input data is available.

Figure 6:
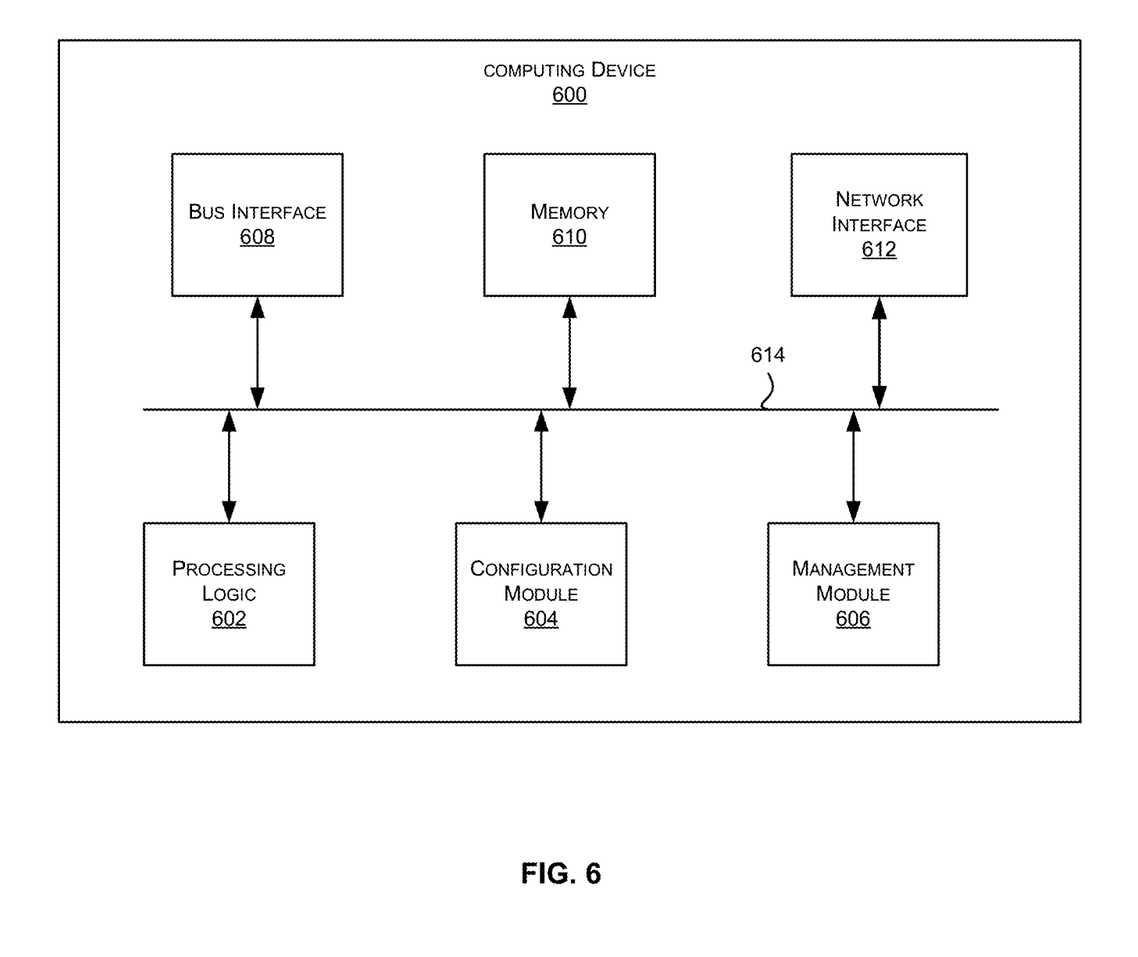
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. The computing device 600 may include functionality of the data flow regulator circuit 102, as discussed with reference to previous figures, to control the flow of data between different bus protocols. A computing device 600 may facilitate processing of packets and/or forwarding of packets from the computing device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 600 may be the recipient and/or generator of packets. In some implementations, the computing device 600 may modify the contents of the packet before forwarding the packet to another device. The computing device 600 may be a peripheral device coupled to another computer device, a switch, a router or any other suitable device enabled for receiving and forwarding packets.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, which are not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit for regulating data flow between devices that use different communication protocols in a computing system, the integrated circuit comprising:
    an input interface configured to:
        receive a write enable for a write transaction from a first device external to the integrated circuit based on an on-chip interface protocol;
        receive input data for the write transaction from the first device; and
        receive an input data size indicating a size of the input data;
    a data buffer configured to store the input data based on the input data size; and
    an output interface configured to:
        receive a read enable to provide output data to a second device external to the integrated circuit for a read transaction based on an off-chip interface protocol, wherein the read enable is received in a same or later clock cycle than the write enable;
        receive a requested size for the output data;
        determine an actual size of the output data based on a comparison, by the integrated circuit, of the requested size to: (i) the input data size received by the input interface and (ii) a size of any portion of the input data currently stored in the data buffer at a time the read enable is received;
        obtain the output data, wherein based on the actual size being greater than the size of any portion of the input data currently stored in the data buffer, the output interface is configured to obtain at least some of the output data from the input data as the input data is being received at the input interface; and
        provide, to the second device, the obtained output data, and the actual size of the output data, wherein the obtained output data is provided without introducing a bubble on the output interface when the requested size is greater than the input data size.

2. The integrated circuit of claim 1, wherein the output data is obtained from stored input data in the data buffer and the input data being received at the input interface when the read enable is received in a same cycle as the write enable, and the requested size is greater than the size of the stored input data.

3. The integrated circuit of claim 1, wherein at least some of the output data is obtained from stored input data in the data buffer when the read enable is received in a cycle later than the write enable.

4. The integrated circuit of claim 1, wherein all of the output data is obtained from stored input data in the data buffer when the requested size is smaller than the size of the stored input data.

5. An integrated circuit for regulating data flow between devices that use different communication protocols, the integrated circuit comprising:
    a first interface configured to:
        receive input data for a write transaction from a first device external to the integrated circuit based on a first bus protocol; and
        receive an input data size indicating a size of the input data;
    a data storage unit configured to store the input data; and
    a second interface configured to:
        receive a requested size to provide output data to a second device external to the integrated circuit for a read transaction based on a second bus protocol;
        determine an actual size of the output data based on a comparison, by the integrated circuit, of the requested size to: (i) the input data size received by the first interface and (ii) a size of any portion of the input data currently stored in the data storage unit at a time of the read transaction; and
        provide the output data, wherein based on the actual size being greater than the size of any portion of the input data currently stored in the data storage unit, the second interface is configured to provide at least some of the output data using the input data as the input data is being received at the first interface.

6. The integrated circuit of claim 5, wherein the input data size and the requested size have different values.

7. The integrated circuit of claim 5, wherein the requested size and the actual size have different values.

8. The integrated circuit of claim 5, wherein the first bus protocol is an on-chip interface protocol, and the second bus protocol is an off-chip interface protocol.

9. The integrated circuit of claim 5, wherein the first interface is further configured to receive a write enable for the write transaction, and the second interface is further configured to receive a read enable for the read transaction.

10. The integrated circuit of claim 9, wherein the second interface is configured to provide a first portion of the output data using stored input data from the data storage unit and a second portion of the output data using the input data being received at the first interface when the requested size is greater than the size of the stored input data and the write enable and the read enable are received in a same cycle.

11. The integrated circuit of claim 10, wherein the requested size is greater than a sum of the size of the stored input data and the input data size, and the actual size of the output data indicates the sum of the size of the stored input data and the input data size.

12. The integrated circuit of claim 9, wherein the input data is stored in the data storage unit when the read enable is not received in a same cycle as the write enable.

13. The integrated circuit of claim 5, wherein the second interface is further configured to provide the actual size of the output data along with the output data.

14. The integrated circuit of claim 5, wherein all of the output data is provided using stored input data in the data storage unit when the requested size is smaller than the size of the stored input data.

15. A method for regulating data flow between devices that use different communication protocols in a computing system, the method comprising, by an integrated circuit:
receiving input data for a write transaction from a first device external to the integrated circuit based on a first bus protocol, wherein the integrated circuit comprises a data storage unit configured to store the input data;
receiving an input data size indicating a size of the input data;
receiving a requested size to provide output data to a second device external to the integrated circuit for a read transaction based on a second bus protocol;
determining an actual size of the output data based on a comparison of the requested size to: (i) the received input data size and (ii) a size of any portion of the input data currently stored in the data storage unit at a time of the read transaction; and
providing the output data, wherein based on the actual size being greater than the size of any portion of the input data currently stored in the data storage unit, at least some of the output data is provided using the input data as the input data is being received.

16. The method of claim 15, further comprising:
determining that the requested size for the read transaction is greater than a size of stored input data in the data storage unit but smaller than a sum of the input data size and the size of the stored input data; and
responsive to determining that the requested size is greater than the size of the stored input data, providing a first portion of the output data using the stored input data and a second portion of the output data using the input data being received.

17. The method of claim 16, further comprising:
storing a remaining portion of the input data in the data storage unit; and
generating a write completion upon storing the remaining portion of the input data in the data storage unit.

18. The method of claim 15, further comprising:
determining that the requested size is greater than a sum of the input data size and a size of stored input data in the data storage unit, wherein determining the actual size of the output data comprises setting the actual size equal to the sum of the input data size and the size of the stored input data; and
providing the actual size of the output data.

* * * * *

UNITED STATES PATENT AND TRADEMARK OFFICE
CERTIFICATE OF CORRECTION

PATENT NO. : 11,782,865 B1
APPLICATION NO. : 17/303561
DATED : October 10, 2023
INVENTOR(S) : Gal Kochavi and Benny Pollak Page 1 of 1

It is certified that error appears in the above-identified patent and that said Letters Patent is hereby corrected as shown below:

In the Claims

Column 18, Line 25: change "providing the actual size of the output data." to --providing the actual size of the output data along with the output data.--

Signed and Sealed this
Eighth Day of October, 2024

Katherine Kelly Vidal
*Director of the United States Patent and Trademark Office*